United States Patent
Yanagita et al.

(10) Patent No.: US 10,090,554 B2
(45) Date of Patent: Oct. 2, 2018

(54) NON-AQUEOUS ELECTROLYTE STORAGE ELEMENT

(71) Applicants: Hideo Yanagita, Tokyo (JP); Satoshi Nakajima, Tokyo (JP)

(72) Inventors: Hideo Yanagita, Tokyo (JP); Satoshi Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 499 days.

(21) Appl. No.: 14/942,379

(22) Filed: Nov. 16, 2015

(65) Prior Publication Data

US 2016/0181655 A1 Jun. 23, 2016

(30) Foreign Application Priority Data

Dec. 18, 2014 (JP) .................................. 2014-255826
Sep. 17, 2015 (JP) .................................. 2015-184079

(51) Int. Cl.
*H01M 6/04* (2006.01)
*H01M 10/052* (2010.01)
(Continued)

(52) U.S. Cl.
CPC ......... *H01M 10/052* (2013.01); *H01M 4/133* (2013.01); *H01M 4/485* (2013.01);
(Continued)

(58) Field of Classification Search
CPC ...... H01M 4/133; H01M 4/485; H01M 4/583; H01M 4/587; H01M 10/052; H01M 10/0525; H01M 10/0566; H01M 10/0568; H01M 2004/021; H01M 2010/4292
See application file for complete search history.

(56) References Cited

U.S. PATENT DOCUMENTS 6,733,925 B2 * 5/2004 Hironaka ................ H01M 2/06
429/209
8,597,827 B2 * 12/2013 Kako ..................... H01M 2/166
361/504
(Continued)

FOREIGN PATENT DOCUMENTS

DE 10 2011 054 122 A1 4/2013
JP 2014-130717 7/2014
(Continued)

OTHER PUBLICATIONS

Extended European Search Report dated Apr. 14, 2016 in Patent Application No. 15198989.4.
(Continued)

*Primary Examiner* — Raymond Alejandro
(74) *Attorney, Agent, or Firm* — Oblon, McClelland, Maier & Neustadt, L.L.P.

(57) ABSTRACT

Non-aqueous electrolyte storage element including; positive electrode including positive electrode material layer, which contains positive electrode active material capable of reversibly accumulating and releasing anions; negative electrode including negative electrode material layer, which contains negative electrode active material capable of reversibly accumulating and releasing cations; separator disposed between the positive electrode and the negative electrode; and non-aqueous electrolyte containing electrolyte salt, the non-aqueous electrolyte storage element satisfying formulae:

$0.5 \leq [(V1+V2+V3)/V4] \leq 0.61$; and $0.14 \leq P1/P2 \leq 0.84$, where V1 is volume of pores of the positive electrode material layer per unit area of the positive electrode, V2 is volume of pores of the negative electrode material layer per
(Continued)

unit area of the negative electrode, V3 is volume of pores per unit area of the separator, and V4 is total volume of the non-aqueous electrolyte storage element, and P1 is porosity of the positive electrode material layer, and P2 is porosity of the separator.

10 Claims, 1 Drawing Sheet

(51) Int. Cl.
    *H01M 4/133*     (2010.01)
    *H01M 4/583*     (2010.01)
    *H01M 4/587*     (2010.01)
    *H01M 10/0525*     (2010.01)
    *H01M 10/0566*     (2010.01)
    *H01M 4/485*     (2010.01)
    *H01M 10/0568*     (2010.01)
    *H01M 4/02*     (2006.01)
    *H01M 10/42*     (2006.01)

(52) U.S. Cl.
    CPC ........... *H01M 4/583* (2013.01); *H01M 4/587* (2013.01); *H01M 10/0525* (2013.01); *H01M 10/0566* (2013.01); *H01M 10/0568* (2013.01); *H01M 2004/021* (2013.01); *H01M 2010/4292* (2013.01)

(56) References Cited

U.S. PATENT DOCUMENTS 9,252,411 B2 *   2/2016   Abd Elhamid ..... H01M 2/1613
9,391,310 B2 *   7/2016   Barchasz ............... B01D 69/02

FOREIGN PATENT DOCUMENTS

WO     WO 2013/045567 A1     4/2013
WO     WO2014/103849 A1     7/2014

OTHER PUBLICATIONS

J.R. Dahn et al., "Energy and Capacity Projections for Practical Dual-Graphite Cells," Journal of the Electrochemical Society, 147(3) 899-901(2000).

\* cited by examiner

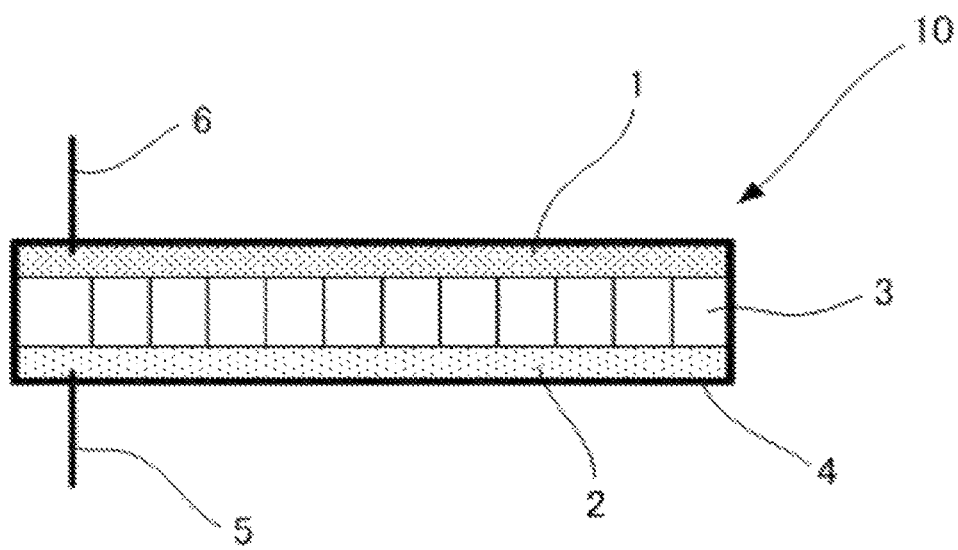

NON-AQUEOUS ELECTROLYTE STORAGE ELEMENT

BACKGROUND OF THE INVENTION

Field of the Invention

The present invention relates to a non-aqueous electrolyte storage element.

Description of the Related Art

In recent years, accompanied by downsizing and enhanced performance of mobile devices, a non-aqueous electrolyte storage element has improved properties thereof and become widespread. Also, attempts are underway to improve load discharge performance and gravimetric energy density of the non-aqueous electrolyte storage element, aiming to expand applications of the non-aqueous electrolyte storage element to electric vehicles.

Conventionally, a lithium ion non-aqueous electrolyte storage element has been widely used as the non-aqueous electrolyte storage element. The lithium ion non-aqueous electrolyte storage element contains a positive electrode, such as a positive electrode of lithium-cobalt composite oxide, a negative electrode of carbon, and a non-aqueous electrolyte prepared by dissolving a lithium salt in a non-aqueous solvent.

Meanwhile, there is a non-aqueous electrolyte storage element, which is charged and discharged by intercalation and deintercalation of anions in a non-aqueous electrolyte to a positive electrode composed of a material, such as a conductive polymer, and a carbonaceous material, and by intercalation and deintercalation of lithium ions in the non-aqueous electrolyte to a negative electrode composed of a carbonaceous material (the aforementioned type of the battery may be referred to as a "dual carbon battery cell" hereinafter) (see, for example, Japanese Patent Application Laid-Open (JP-A) No. 2014-130717).

As indicated by the following reaction formula, the dual carbon battery cell is charged by intercalation of anions, such as $PF_6^-$, from the non-aqueous electrolyte to the positive electrode, and intercalation of $Li^+$ from the non-aqueous electrolyte to the negative electrode, and the cell is discharged by deintercalation of anions, such as $PF_6^-$, from the positive electrode, and deintercalation of $Li^+$, from the negative electrode to the non-aqueous electrolyte.

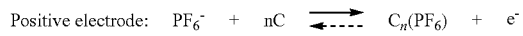

→ charging reaction
← - - - discharge reaction

The discharge capacity of the dual carbon battery cell is determined with the anion storage capacity of the positive electrode, the anion releasable amount of the positive electrode, the cation storage capacity of the negative electrode, the cation releasable amount of the negative electrode, the anion amount of the non-aqueous electrolyte, and the cation amount of the non-aqueous electrolyte. In order to increase the discharge capacity of the dual carbon battery cell, therefore, it is necessary to increase not only a positive electrode active material and a negative electrode active material, but also an amount of the nonaqueous electrolyte containing a lithium salt (see, for example, Journal of The Electrochemical Society, 147(3) 899-901 (2000)).

A sufficient amount of the electrolyte salt is required in the aforementioned non-aqueous electrolyte storage element, which is charged by accumulating anions into the positive electrode and cations from the negative electrode from the non-aqueous electrolyte, and is discharged by releasing anions from the positive electrode and cations from the negative electrode to the non-aqueous electrolyte. It is important to insert the non-aqueous electrolyte into the limited volume of the non-aqueous electrolyte storage element in order to improve the volume energy density of the storage element. If the porosities of the electrodes are increased to insert a sufficient amount of the non-aqueous electrolyte, however, there is a problem that high load discharge performance is impaired, as contact between active material particles is reduced.

In a non-aqueous electrolyte storage element using a lithium accumulating and releasing positive electrode, such as an oxide complex positive electrode, and a lithium accumulating and releasing negative electrode, such as graphite, a concentration of the electrolyte salt is substantially unchanged with charging and discharging. Therefore, the densities of the electrodes are set high to insert as much an amount of a storing material as possible inside the storage element (to increase the energy density of the storage element), which lowers porosities of the electrodes. In the case where a storage element is composed to have the same structure to that of the storage element where the concentration of the electrolyte salt is substantially unchanged with charging and discharging, an amount of the non-aqueous electrolyte that can be inserted into the storage element is reduced to lower the concentration of the electrolyte salt, leading to a problem that sufficient charging capacity and discharging capacity of the storage element cannot be attained. If the amount of the non-aqueous electrolyte is substantially increased by excessively increasing a thickness of a separator to solve the aforementioned problem, the energy density of the non-aqueous electrolyte storage element is reduced by the increased amount of the separator, which does not contribute to storage of electricity.

In the case where the concentration of the electrolyte salt is increased to about 3 mol/L in a non-aqueous electrolyte storage element using, as a positive electrode, an electrode accumulating therein anions, and the storage element is charged with high voltage, furthermore, there is a problem that a capacity of the storage element is reduced.

Accordingly, there is a demand for a non-aqueous electrolyte storage element, which can realize a high energy density, and a high load discharge performance, and has improved charge-discharge cycle property.

SUMMARY OF THE INVENTION

The present invention aims to provide a non-aqueous electrolyte storage element, which can realize a high energy density, and a high load discharge performance, and has improved charge-discharge cycle property.

As the means for solving the aforementioned problems, the non-aqueous electrolyte storage element of the present invention includes a positive electrode including a positive electrode material layer, where the positive electrode material layer includes a positive electrode active material capable of reversibly accumulating and releasing anions, a negative electrode including a negative electrode material layer, where the negative electrode material layer includes a negative electrode active material capable of reversibly accumulating and releasing cations, a separator disposed between the positive electrode and the negative electrode, and a non-aqueous electrolyte containing an electrolyte salt. The non-aqueous electrolyte storage element satisfies the following formulae:

$$0.5 \leq [(V1+V2+V3)/V4] \leq 0.61$$

$$0.14 \leq P1/P2 \leq 0.84$$

In the formulae above, V1 is a volume of pores of the positive electrode material layer per unit area of the positive electrode, V2 is a volume of pores of the negative electrode material layer per unit area of the negative electrode, V3 is a volume of pores per unit area of the separator, and V4 is a total volume of the non-aqueous electrolyte storage element, and P1 is a porosity of the positive electrode material layer, and P2 is a porosity of the separator.

The present invention can provide a non-aqueous electrolyte storage element, which can realize a high energy density, and a high load discharge performance, and has improved charge-discharge cycle property.

BRIEF DESCRIPTION OF THE DRAWINGS

FIG. 1 is a schematic view illustrating one example of the non-aqueous electrolyte storage element of the present invention.

DETAILED DESCRIPTION OF THE INVENTION

Non-Aqueous Electrolyte Storage Element

The non-aqueous electrolyte storage element of the present invention includes a positive electrode, a negative electrode, a non-aqueous electrolyte, and a separator. The non-aqueous electrolyte storage element may further contain other members, if necessary.

The non-aqueous electrolyte storage element is appropriately selected depending on the intended purpose without any limitation. Examples of the non-aqueous electrolyte storage element include a non-aqueous electrolyte secondary battery, and a non-aqueous electrolyte capacitor.

The present inventors have diligently researched and studied to solve the aforementioned problems. As a result, it has been found that it is necessary to adjust porosities of electrodes and separator to secure conductivity inside the electrode layers and a sufficient amount of a non-aqueous electrolyte, and to adjust a distance between the positive electrode and the negative electrode, in order to achieve high energy density and high load discharge performance of, particularly an anion-intercalation storage element, in which a concentration of an electrolyte salt in the non-aqueous electrode changes with charging and discharging, and to improve a charge-discharge cycle property of the storage element. Therefore, it has been found that porosities of the element, which determines an amount of the non-aqueous electrolyte provided inside, is important, especially in the anion-intercalation storage element, in which a concentration of an electrolyte salt in the non-aqueous electrode changes with charging and discharging.

In order to achieve the high energy density and high load discharge performance, in the present invention, it is necessary to increase an amount of the electrolyte salt in the non-aqueous electrolyte, specifically, to increase the volume of the separator, in which the non-aqueous electrolyte is stored.

The non-aqueous electrolyte can be stored in pores of the positive electrode material layer (excluding the positive electrode collector), pores of the negative electrode material layer (excluding the negative electrode collector), and the separator.

Accordingly, it is important that V1, V2, V3, and V4 satisfy the following formula: $0.5 \leq [(V1+V2+V3)/V4] \leq 0.61$, where V1 is a volume of pores of the positive electrode material per unit area of the positive electrode, V2 is a volume of pores of the negative electrode material layer per unit area of the negative electrode, V3 is a volume of pores per unit area of the separator, and V4 is a total volume of the non-aqueous electrolyte storage element.

When the ratio $[(V1+V2+V3)/V4]$ is 0.5 or greater, an appropriate amount of the non-aqueous electrolyte can be secured, and a capacity can be increased. When the ratio $[(V1+V2+V3)/V4]$ is 0.61 or less, moreover, high energy density and high load discharge performance of the storage element can be achieved. The conductivity of the non-aqueous electrolyte cannot be sufficient with too high or too low concentration of the electrolyte salt. The change of the electrolyte salt concentration in the non-aqueous electrolyte can be appropriately adjusted by setting the porosities to satisfy the aforementioned range.

When the ratio $[(V1+V2+V3)/V4]$ is less than 0.5, the concentration of the electrolyte salt in the non-aqueous electrolyte reduces to thereby reduce an amount of ions for intercalation, hence charge may not be able to be performed. When the ratio is greater than 0.61, the resistance increases, as the space inside the non-aqueous electrolyte storage element increases, and the distance between the electrodes increases, hence charging and discharging may not be performed with high output.

For example, the volume of pores of the negative electrode material layer per unit area of the negative electrode means a volume of pores contained in the negative electrode material layer, in the case where the negative electrode material layer is formed through coating on the negative electrode collector of the negative electrode. The definitions of the volume of pores of the positive electrode material per unit area of the positive electrode, and the volume of pores per unit area of the separator are the same.

For example, the volume of pores of the negative electrode material layer per unit area of the negative electrode, the volume of pores of the positive electrode material layer per unit area of the positive electrode, and the volume of pores of the separator can be measured by a mercury porosimeter or a pycnometer (a gas displacement method).

It is important that that the ratio represented by P1/P2 is within the following range.

$$0.14 \leq P1/P2 \leq 0.84$$

In the ratio above, P1 is the porosity of the positive electrode material, and P2 is the porosity of the separator.

When the ratio (P1/P2) is 0.14 or greater, an appropriate amount of the non-aqueous electrolyte in the positive electrode material layer and an appropriate distance between the positive electrode and the negative electrode are secured to improve an output and service life of the storage element. When the ratio is 0.84 or less, the number of pores in the positive electrode material layer, the conductivity inside the positive electrode material layer, and the amount of the electrolyte solution in the separator become appropriate to thereby improve output performance.

When the ratio (P1/P2) is less than 0.14, the amount of the non-aqueous electrolyte inside the positive electrode is small, leading to an insufficient amount of the electrolyte salt associated with charging and discharging. When the ratio (P1/P2) is greater than 0.84, the resistance increases, as the distances between the particles of the positive electrode active material increase, and thus charging and discharging may not be performed with high output.

The porosity of the positive electrode material layer and the porosity of the negative electrode material layer are appropriately selected depending on the intended purpose without any limitation. The porosity of the positive electrode material layer and the porosity of the negative electrode material layer are both preferably 0.25 to 0.65. For maintaining the electrolyte salt, and securing the strength, the porosities thereof are preferably 0.25 to 0.5.

When the porosity is 0.25 or greater, the volume for including the non-aqueous electrolyte increases. Therefore, it is necessary to reduce the concentration of the electrolyte salt to maintain the capacity of the storage element. As the concentration of the electrolyte salt is reduced, the resistance reduces, low temperature properties become excellent, and decomposition of the electrolyte salt in the positive electrode can be prevented. When the porosity is 0.65 or less, the strength of the electrode becomes excellent.

The porosity of the separator is appropriately selected depending on the intended purpose without any limitation, but the porosity of the separator is preferably in the range of 0.3 to 0.8.

The porosity of the positive electrode material layer, the porosity of the negative electrode material layer, and the porosity of the separator can be each calculating by dividing "pore volume" determined by a mercury porosimeter or a pycnometer with "a volume determined by obtained by multiplying a geometric area of the electrode with a thickness of the electrode material layer."

The anion storage and desorption amount per unit area of the positive electrode is preferably 0.15 mAh/cm$^2$ to 0.60 mAh/cm$^2$. When the anion storage and desorption amount per unit area of the positive electrode is 0.15 mAh/cm$^2$ or greater, the stability of charging-discharging cycles improves. When the anion storage and desorption amount is 0.60 mAh/cm$^2$ or less, the amount of the electrolyte solution required is appropriate, and output performance improves.

For example, the anion storage and desorption amount per unit area of the positive electrode can be measured by using metal lithium as a negative electrode, providing the positive electrode to face the negative electrode via a separator, and performing charging and discharging in the electrolyte solution.

Regarding a relationship of a capacity of the positive electrode and a capacity of the negative electrode, it is necessary to inhibit the reduction of the capacity due to deterioration of the negative electrode in order to maintain stability of repetitive charging and discharging. The larger capacity of the negative electrode per unit area than the capacity of the positive negative electrode per unit area is effective for preventing a reduction in a discharge capacity due to repetitive cycles of charging and discharging.

The capacity ratio (negative electrode capacity (C1)/positive electrode capacity (C2)) is appropriately selected depending on the intended purpose without any limitation, provided that the capacity of the negative electrode is larger than the capacity of the positive electrode. The capacity ratio (C1/C2) is preferably 1.05 to 6. When the capacity ratio (C1/C2) is 1.05 or less, deterioration of cycles along with precipitation of Li can be prevented. When the capacity ratio (C1/C2) is 6 or less, the capacity is improved, and cycle properties can be maintained because a sufficient amount of the non-aqueous electrolyte is maintained, and therefore the energy density of the storage element itself is improved.

For example, the capacity of the positive electrode per unit area, and the capacity of the negative electrode per unit area can be measured by means of a commercially available charge-discharge device. The capacity per unit area is a capacity with respect to a geometric area of the electrode. The capacity of the positive electrode can be measured by charging up to a predetermined upper voltage with using lithium as a counter electrode, and discharging to the predetermined voltage. The predetermined voltage is based on a charging and discharging method when the non-aqueous electrolyte storage element is composed. The capacity of the negative electrode can be measured in the similar manner.

Hereinafter, the positive electrode, negative electrode, non-aqueous electrolyte, and separator of the non-aqueous electrolyte storage element of the present invention are sequentially described.

<Positive Electrode>

The positive electrode is appropriately selected depending on the intended purpose without any limitation, provided that the positive electrode contains a positive electrode active material. Examples of the positive electrode include a positive electrode, which contains a positive electrode material layer containing a positive electrode active material, provided on a positive electrode collector.

The shape of the positive electrode is appropriately selected depending on the intended purpose without any limitation, and examples of the shape include a plate shape.

<<Positive Electrode Material Layer>>

The positive electrode material layer is appropriately selected depending on the intended purpose without any limitation. For example, the positive electrode material layer contains at least a positive electrode active material, and may further contain a conductive agent, a binder, and a thickening agent, if necessary.

—Positive Electrode Active Material—

The positive electrode active material is appropriately selected depending on the intended purpose without any limitation, provided that the positive electrode active material is a material capable of reversibly accumulating and releasing anions. Examples of the positive electrode active material include a carbonaceous material, and a conductive polymer. Among them, a carbonaceous material is particularly preferable because of high energy density thereof.

Examples of the conductive polymer include polyaniline, polypyrrole, and polyparaphenylene.

Examples of the carbonaceous material include blacklead (graphite), such as coke, artificial graphite, natural graphite, and a thermal decomposition product of an organic material under various thermal decomposition conditions. Among them, artificial graphite, and natural graphite are particularly preferable.

The carbonaceous material is preferably a carbonaceous material having high crystallinity. The crystallinity can be evaluated by X-ray diffraction, or Raman analysis. For example, in a powder X-ray diffraction pattern thereof using CuKα rays, the intensity ratio $I_{2\theta=22.3°}/I_{2\theta=26.4°}$ of the diffraction peak intensity $I_{2\theta=22.3°}$ at $2\theta=22.3°$ to the diffraction peak intensity $I_{2\theta=26.4°}$ at $2\theta=26.4°$ is preferably 0.4 or less.

A BET specific surface area of the carbonaceous material as measured by nitrogen adsorption is preferably 1 m$^2$/g to 100 m$^2$/g. The average particle diameter (median diameter) of the carbonaceous material as measured by a laser diffraction-scattering method is preferably 0.1 μm to 100 μm.

—Binder—

The binder is appropriately selected depending on the intended purpose without any limitation, provided that the binder is a material stable to a solvent used during production of electrodes, or an electrolyte. Examples of the binder include a fluorine-based binder, such as a polyvinylidene fluoride (PVDF), and polytetrafluoroethylene (PTFE), styrene-butadiene rubber (SBR), and isoprene rubber. These may be used alone, or in combination.

—Thickening Agent—

Examples of the thickening agent carboxy methyl cellulose (CMC), methyl cellulose, hydroxyl methyl cellulose, ethyl cellulose, polyvinyl alcohol, oxidized starch, starch phosphate, and casein. These may be used alone, or in combination.

—Conductive Agent—

Examples of the conductive agent include a metal material (e.g., copper, and aluminium), and a carbonaceous material (e.g., carbon black, and acetylene black).

The average thickness of the positive electrode material layer is appropriately selected depending on the intended purpose without any limitation, but the average thickness of the positive electrode material layer is preferably 20 µm to 300 µm, more preferably 40 µm to 150 µm. When the average thickness of the positive electrode material layer is less than 20 µm, the energy density may be reduced. When the average thickness thereof is greater than 300 µm, the load performance may be impaired.

<<Positive Electrode Collector>>

The material, shape, size, and structure of the positive electrode collector are appropriately selected depending on the intended purpose without any limitation.

The material of the positive electrode collector is appropriately selected depending on the intended purpose without any limitation, provided that the material is formed of a conductive material. Examples of the material of the positive electrode collector include stainless steel, nickel, aluminium, titanium, and tantalum. Among them, stainless steel and aluminum are particularly preferable.

The shape of the positive electrode collector is appropriately selected depending on the intended purpose without any limitation.

The size of the positive electrode collector is appropriately selected depending on the intended purpose without any limitation, provided that it is a size appropriately used as a non-aqueous electrolyte storage element.

—Production Method of Positive Electrode—

The positive electrode material layer can be formed by applying a positive electrode material composition onto the positive electrode collector, and drying the positive electrode material composition. The positive electrode material composition is prepared by adding the binder, the thickening agent, the conductive agent, a solvent to the positive electrode active material according to the necessity, and forming the resulting mixture into slurry. The solvent is appropriately selected depending on the intended purpose without any limitation. Examples of the solvent include an aqueous solvent, and an organic solvent. Examples of the aqueous solvent include water and alcohol. Examples of the organic solvent include N-methyl-2-pyrrolidone (NMP), and toluene.

Note that, the positive electrode active material may be subjected to roll molding as it is to form a sheet electrode, or to compression molding to form a pellet electrode.

<Negative Electrode>

The negative electrode is appropriately selected depending on the intended purpose without any limitation, provided that the negative electrode contains a negative electrode active material. Examples of the negative electrode include a negative electrode, which contains a negative electrode material layer containing a negative electrode active material, provided on a negative electrode collector.

The shape of the negative electrode is appropriately selected depending on the intended purpose without any limitation, and example of the shape of the negative electrode include a plate shape.

<<Negative Electrode Material Layer>>

The negative electrode material layer contains at least a negative electrode active material, and may further contain a binder, and a conductive agent, if necessary.

—Negative Electrode Active Material—

The negative electrode active material is appropriately selected depending on the intended purpose without any limitation, provided that the negative electrode active material is a material capable of reversible accumulating and releasing cations. Examples of the negative electrode active material include: alkali metal ion; alkali earth metal; metal oxide capable of adsorbing and releasing alkali metal ion or alkali earth metal; metal capable of forming an alloy with alkali metal ion or alkali earth metal; an alloy containing the metal; a composite alloy compound containing the metal; and a non-reactive electrode due to physical adsorption of ions, such as a carbonaceous material having a large specific surface area. Among them, preferred is a material capable of reversibly accumulating and releasing lithium, or lithium ions, or both thereof, in view of the energy density, and more preferred is a non-reactive electrode in view of recycling capability.

Specific examples of the negative electrode active material include: a carbonaceous material; metal oxide capable of adsorbing and releasing lithium, such as lithium titanate, antimony-doped tin oxide, and silicon monoxide; metal or alloy capable of forming an alloy with lithium, such as aluminum, tin, silicon, and zinc; a composite alloy compound composed of metal capable of forming an alloy with lithium, an alloy containing the metal, and lithium; and lithium metal nitride, such as lithium cobalt nitride. These may be used alone, or in combination. Among them, a carbonaceous material, and lithium titanate are particularly preferable in view of safety and cost.

Examples of the carbonaceous material include: black-lead (graphite), such as coke, artificial graphite, and natural graphite, a thermal decomposition product of an organic material under various thermal decomposition conditions, and amorphous carbon. Among them, artificial graphite, natural graphite, and amorphous carbon are particularly preferable. As for lithium titanate, particularly preferred is an analogue compound having $Li_4Ti_5O_{12}$, or $Li_4Ti_5O_{12}$ as a basic skeleton, in which part of elements thereof is substituted.

—Binder—

The binder is appropriately selected depending on the intended purpose without any limitation, and examples of the binder include a fluorine-based binder, such as polyvinylidene fluoride (PVDF), and polytetrafluoroethylene (PTFE), ethylene-propylene-butadiene rubber (EPBR), styrene-butadiene rubber (SBR), isoprene rubber, and carboxy methyl cellulose (CMC). These may be used alone, or in combination. Among them, the fluorine-based binder, such as polyvinylidene fluoride (PVDF) and polytetrafluoroethylene (PTFE), and carboxymethyl cellulose (CMC) are preferable, and CMC is particularly preferable, as CMC contributes to improvement in the number of repeated charging-discharging compared to other binders.

—Conductive Agent—

Examples of the conductive agent include a metal material (e.g., copper, and aluminium), and a carbonaceous material (e.g., carbon black, and acetylene black). These may be used alone, or in combination.

The average thickness of the negative electrode material layer is appropriately selected depending on the intended purpose without any limitation, but the average thickness of the negative electrode material layer is preferably 10 µm to 450 µm, more preferably 20 µm to 100 µm. When the average thickness of the negative electrode material layer is less than 10 µm, charging-discharging cycle properties may be degraded. When the average thickness thereof is greater than 450 µm, the energy density may be reduced.

<<Negative Electrode Collector>>

The material, shape, size, and structure of the negative electrode collector are appropriately selected depending on the intended purpose without any limitation.

The material of the negative electrode collector is appropriately selected depending on the intended purpose without any limitation, provided that the material of the negative electrode collector is formed of a conductive material. Examples of the material of the negative electrode collector include stainless steel, nickel, aluminium, and copper. Among them, stainless steel, and copper are particularly preferable.

The shape of the negative electrode collector is appropriately selected depending on the intended purpose without any limitation.

The size of the negative electrode collector is appropriately selected depending on the intended purpose without any limitation, provided that it can be a size usable for the non-aqueous electrolyte storage element.

—Production Method of Negative Electrode—

The negative electrode can be formed by applying a negative electrode material composition onto the negative electrode collector, and drying the negative electrode material composition. The negative electrode material composition is prepared by adding the binder, the conductive agent, and a solvent to the negative electrode active material according to the necessity to form the resulting mixture into slurry. As for the solvent, the same solvent used in the production method of the positive electrode can be used.

Moreover, a composition, in which the binder, the conductive agent, etc. are added to the negative electrode active material, may be subjected to roll molding as it is to form a sheet electrode or to compression molding to form a pellet electrode. Alternatively, a thin layer of the negative electrode active material may be formed on the negative electrode collector by a method, such as vapor deposition, sputtering, and plating.

<Non-Aqueous Electrolyte>

The non-aqueous electrolyte is an electrolyte containing a non-aqueous solvent, and an electrolyte salt.

<<Non-Aqueous Solvent>>

The non-aqueous solvent is appropriately selected depending on the intended purpose without any limitation, but the non-aqueous solvent is preferably an aprotic organic solvent.

As for the aprotic organic solvent, a carbonate-based organic solvent, such as chain carbonate, and cyclic carbonate, is used.

Examples of the chain carbonate include dimethyl carbonate (DMC), diethyl carbonate (DEC), methyl ethyl carbonate (EMC), and methyl propionate (MP).

Examples of the cyclic carbonate include propylene carbonate (PC), ethylene carbonate (EC), butylene carbonate (BC), and vinylene carbonate (VC).

In the case where a mixed solvent combining ethylene carbonate (EC) as the cyclic carbonate with dimethyl carbonate (DMC) as the chain carbonate, a blending ratio of the ethylene carbonate (EC) and the dimethyl carbonate (DMC) is appropriately selected depending on the intended purpose without any limitation.

Note that, as for the non-aqueous solvent, an ester-based organic solvent, such as cyclic ester, and chain ester, or an ether-based organic solvent, such as cyclic ether, and chain ether may be used.

Examples of the cyclic ester include γ-butyrolactone (γBL), 2-methyl-γ-butyrolactone, acetyl-γ-butyrolactone, and γ-valerolactone.

Examples of the chain ester include alkyl propionate, dialkyl malonate, alkyl acetate (e.g., methyl acetate (MA), and ethyl acetate), and alkyl formate (e.g., methyl formate (MF), and ethyl formate).

Examples of the cyclic ether include tetrahydrofuran, alkyl tetrahydrofuran, alkoxy tetrahydrofuran, dialkoxy tetrahydrofuran, 1,3-dioxolan, alkyl-1,3-dioxolan, and 1,4-dioxolan.

Examples of the chain ether include 1,2-dimethoxyethane (DME), diethyl ether, ethylene glycol dialkyl ether, diethylene glycol dialkyl ether, triethylene glycol dialkyl ether, and tetraethylene glycol dialkyl ether.

<<Electrolyte Salt>>

The electrolyte salt is not particularly limited, provided that the electrolyte salt contains a halogen atom, is dissolved in a non-aqueous solvent, and exhibits high ion conductivity. As for the electrolyte salt, a combination of the following cation and the following anion can be used.

Examples of the cation include alkali metal ion, alkali earth metal ion, tetraalkyl ammonium ion, and spiro quaternary ammonium ion.

Examples of the anion include $Cl^-$, $Br^-$, $I^-$, $ClO_4^-$, $BF_4^-$, $PF_6^-$, $SbF_6^-$, $CF_3SO_3^-$, $(CF_3SO_2)_2N^-$, and $(C_2F_5SO_2)_2N^-$.

Among the electrolyte salts containing a halogen atom, a lithium salt is particularly preferable, as use thereof improves a battery capacity. The lithium salt is appropriately selected depending on the intended purpose without any limitation, and examples of the lithium salt include lithium hexafluorophosphate ($LiPF_6$), lithium perchlorate ($LiClO_4$), lithium chloride (LiCl), lithium fluoroborate ($LiBF_4$), lithium hexafluoroarsenate ($LiAsF_6$), lithium trifluorosulfonate ($LiCF_3SO_3$), lithium bistrifluoromethylsulfonyl imide ($LiN(C_2F_5SO_2)_2$), and lithium bisperfluoroethylsulfonyl imide ($LiN(CF_2F_5SO_2)_2$). These may be used alone, or in combination. These may be used alone, or in combination. Among them, $LiPF_6$ is particularly preferable in view of the size of the storage capacity of anions in the carbon electrode.

The amount of the electrolyte salt is appropriately selected depending on the intended purpose without any limitation. The amount of the electrolyte salt in the non-aqueous solvent is preferably 1.5 mol/L to 4 mol/L, more preferably 1.5 mol/L to 3 mol/L, and even more preferably 1.5 mol/L to 2.5 mol/L for achieving both a desirable battery capacity and desirable output.

<Separator>

The separator is provided between the positive electrode and the negative electrode for the purpose of preventing a short circuit between the positive electrode and the negative electrode.

The material, shape, size and structure of the separator are appropriately selected depending on the intended purpose without any limitation.

Examples of the material of the separator include: paper, such as kraft paper, vinylon blended paper, and synthetic pulp blended paper; polyolefin nonwoven fabric, such as cellophane, a polyethylene graft membrane, and polypropylene melt-flow nonwoven fabric; polyamide nonwoven fabric; and glass fiber nonwoven fabric.

Among them, a material having a porosity of 50% or greater is preferable in view of holding a non-aqueous electrolyte.

As for the shape of the separator, a nonwoven separator is more preferable than a thin film separator having micropores, in view of high porosity thereof.

The average thickness of the separator is appropriately selected depending on the intended purpose without any limitation, but the average thickness of the separator is preferably 20 μm to 200 μm, more preferably 20 μm to 100 μm. When the average thickness of the separator is 20 μm or greater, an amount of the electrolyte held can be made large. When the average thickness thereof is 200 μm or less, moreover, the energy density is increased.

Examples of the shape of the separator include a sheet shape.

The size of the separator is appropriately selected depending on the intended purpose without any limitation, provided that it is the size suitable for a non-aqueous electrolyte storage element.

The structure of the separator may be a single layer structure, or a multilayer structure.

<Other Members>

Other members are appropriately selected depending on the intended purpose without any limitation, and examples thereof include an outer tin, and an electrode lead wire.

<Production Method of Non-Aqueous Electrolyte Storage Element>

The non-aqueous electrolyte storage element of the present invention can be produced by assembling the positive electrode, the negative electrode, the non-aqueous electrolyte, and the separator into an appropriate shape. Moreover, other constitutional members, such as an outer tin, can be used, if necessary. The assembling method of the non-aqueous electrolyte storage element is appropriately selected from generally employed methods without any limitation.

The non-aqueous electrolyte storage element of the present invention is appropriately selected depending on the intended purpose without any limitation, but the maximum voltage during the charging and discharging thereof is preferably 4.3V vs Li/Li$^+$ to 6.0V vs Li/Li$^+$. When the maximum voltage during the charging and discharging is 4.3V vs Li/Li$^+$ or greater, anions can be accumulated, and the capacity of the element is increased. When the maximum voltage during the charging and discharging is 6.0V vs Li/Li$^+$ or less, moreover, decomposition of the solvent or electrolyte salt does not occur, to thereby prevent deterioration of the element.

The maximum voltage of the positive electrode can be measured by taking out the charged-state positive electrode, using metal lithium as a negative electrode, providing a separator capable of transmitting lithium ions between the negative electrode and the positive electrode, and immersing the positive electrode, the negative electrode, and the separator in a non-aqueous electrolyte prepared by dissolving an electrolyte salt in a non-aqueous solvent.

FIG. 1 is a schematic view illustrating one example of the non-aqueous electrolyte storage element of the present invention. The non-aqueous electrolyte storage element 10 contains, in an outer tin 4 thereof, a positive electrode 1 containing a positive electrode active material capable of reversibly accumulating and releasing anions, a negative electrode 2 containing a negative electrode active material capable of reversibly accumulating and releasing cations, and a separator 3 provided between the positive electrode 1 and the negative electrode 2. The positive electrode 1, the negative electrode 2, and the separator 3 are immersed in a non-aqueous electrolyte (not illustrated) prepared by dissolving an electrolyte salt in a non-aqueous solvent. Note that, "5" denotes a negative electrode lead wire, and "6" denotes a positive electrode lead wire.

—Shape—

The shape of the non-aqueous electrolyte storage element of the present invention is appropriately selected from various shapes typically adapted depending on use thereof, without any limitation. Examples of the shape of the non-aqueous electrolyte storage element include a laminate electrode, a cylinder electrode where a sheet electrode and a separator are spirally provided, a cylinder element having an inside-out structure, in which a pellet electrode and a separator are used in combination, and a coin element, in which a pellet electrode and a separator are laminated.

<Use>

Use of the non-aqueous electrolyte storage element of the present invention is not particularly limited, and the non-aqueous electrolyte storage element can be used for various use. Examples thereof include power supplies or back-up power supplies for a laptop computer, a stylus-operated computer, a mobile computer, an electronic book player, a mobile phone, a mobile fax, a mobile printer, a headphone stereo, a video movie, a liquid crystal television, a handy cleaner, a portable CD, a minidisk, a transceiver, an electronic organizer, a calculator, a memory card, a mobile tape recorder, a radio, a motor, lighting equipment, a toy, game equipment, a clock, a strobe, and a camera.

EXAMPLES

Examples of the present invention are described hereinafter, but these examples shall not be construed as to limit the scope of the present invention in any way.

<Measurements of Porosities and Pore Volumes of Positive Electrode Material Layer, Negative Electrode Material Layer, and Separator>

Porosities of the positive electrode material layer, the negative electrode material layer, and the separator were determined by measuring a gas absorption amount (pore volume) inside the electrodes by means of Pycnometer 1200e manufactured by Malvern Instruments Ltd., and dividing the gas absorption amount (pore volume) by a geometric volume of the electrodes.

<Average Thickness of Positive Electrode Material Layer and Negative Electrode Material Layer>

The average thickness of each of the positive electrode material layer and the negative electrode material layer was determined in the following manner. A thickness of an electrode was measured by a micrometer (G2-205, manufactured by OZAKI MFG. CO., LTD.), subtracting a thickness of a collector from the measured thickness of the electrode, to determined thicknesses of a positive electrode material layer and a negative electrode material layer. An average value of the thickness values measured in a several spots was determined as the average thickness.

<Average Thickness of Separator>

The average thickness of the separator was measured by measuring the thickness of the separator using a micrometer (G2-205, manufactured by OZAKI MFG. CO., LTD.) at several spots, and calculating the average value of the measured thicknesses to thereby determine the average thickness.

Production Example 1 of Positive Electrode

Production of Positive Electrode A

As for a positive electrode active material, a graphite powder was used. The graphite powder had a BET specific surface area of 3.0 $m^2/g$ as measured by nitrogen absorption, and had the average particle diameter (median diameter) of 8.8 μm, as measured by a laser diffraction particle size analyzer (SALD-2200, manufactured by Shimadzu Corporation).

Water was added to the graphite powder and a conductive agent (acetylene black), and the resulting mixture was kneaded. Moreover, as a thickening agent, a 2% by mass carboxy methyl cellulose (CMC) aqueous solution was added to the kneaded product, and the resulting mixture was kneaded. To the resultant, a binder (styrene butadiene rubber SBR) was further added to thereby produce a positive electrode material layer composition (slurry). The solid content ratio of the positive electrode material layer was set as follows: graphite powder/conductive agent/thickening agent/binder=93/5/1/1. The positive electrode material layer composition was applied onto an aluminium foil, followed by vacuum drying for 12 hours at 150° C., to thereby form a positive electrode material layer. A circle having a diameter of 16 mm was stamped out of the positive electrode material layer, to thereby produce Positive Electrode A. The mass per unit area of the carbon powder (graphite) in the positive electrode material layer coated on the aluminium (Al) foil having a diameter of 16 mm was 10 $mg/cm^2$, the average thickness of the positive electrode material layer was 125 μm, and the porosity of the positive electrode material layer was 0.65.

Production Example 2 of Positive Electrode

Production of Positive Electrode B

Positive Electrode A as produced was compressed by means of a press (manufactured by Tester Sangyo Co., Ltd.) to thereby produce Positive Electrode B, which contained the positive electrode material layer having the average thickness of 100 μm. The porosity of the positive electrode material layer was 0.56.

Production Example 3 of Positive Electrode

Production of Positive Electrode C

Positive Electrode A as produced was compressed by means of a press (manufactured by Tester Sangyo Co., Ltd.) to thereby produce Positive Electrode C, which contained the positive electrode material layer having the average thickness of 76.9 μm. The porosity of the positive electrode material layer was 0.42.

Production Example 4 of Positive Electrode

Production of Positive Electrode D

Positive Electrode A as produced was compressed by means of a press (manufactured by Tester Sangyo Co., Ltd.) to thereby produce Positive Electrode D, which contained the positive electrode material layer having the average thickness of 62.5 μm. The porosity of the positive electrode material layer was 0.29.

Production Example 5 of Positive Electrode

Production of Positive Electrode E

Positive Electrode A as produced was compressed by means of a press (manufactured by Tester Sangyo Co., Ltd.) to thereby produce Positive Electrode E, which contained the positive electrode material layer having the average thickness of 58.8 μm. The porosity of the positive electrode material layer was 0.25.

Production Example 6 of Positive Electrode

Production of Positive Electrode F

As for a positive electrode active material, a graphite powder was used. The graphite powder had a BET specific surface area of 3.0 $m^2/g$ as measured by nitrogen absorption, and had the average particle diameter (median diameter) of 8.8 μm, as measured by a laser diffraction particle size analyzer (SALD-2200, manufactured by Shimadzu Corporation).

Water was added to the graphite powder and a conductive agent (acetylene black), and the resulting mixture was kneaded. Moreover, as a thickening agent, a 2% by mass carboxy methyl cellulose (CMC) aqueous solution was added to the kneaded product, and the resulting mixture was kneaded. To the resultant, a binder (styrene butadiene rubber SBR) was further added to thereby produce a positive electrode material layer composition (slurry). The solid content ratio of the positive electrode material layer was set as follows: graphite powder/conductive agent/thickening agent/binder=93/5/1/1. The positive electrode material layer composition was applied onto an aluminium foil, followed by vacuum drying for 12 hours at 150° C., to thereby form a positive electrode material layer. A circle having a diameter of 16 mm was stamped out of the positive electrode material layer, to thereby produce Positive Electrode F.

The mass per unit area of the carbon powder (graphite) in the positive electrode material layer coated on the aluminium (Al) foil having a diameter of 16 mm was 3 $mg/cm^2$, the average thickness of the positive electrode material layer was 37.5 μm, and the porosity of the positive electrode material layer was 0.65.

Production Example 7 of Positive Electrode

Production of Positive Electrode G

Positive Electrode F as produced was compressed by means of a press (manufactured by Tester Sangyo Co., Ltd.) to thereby produce Positive Electrode G, which contained the positive electrode material layer having the average thickness of 30 μm. The porosity of the positive electrode material layer was 0.56.

Production Example 8 of Positive Electrode

Production of Positive Electrode H

Positive Electrode F as produced was compressed by means of a press (manufactured by Tester Sangyo Co., Ltd.) to thereby produce Positive Electrode H, which contained the positive electrode material layer having the average thickness of 23.1 μm. The porosity of the positive electrode material layer was 0.42.

Production Example 9 of Positive Electrode

Production of Positive Electrode I

Positive Electrode F as produced was compressed by means of a press (manufactured by Tester Sangyo Co., Ltd.) to thereby produce Positive Electrode I, which contained the positive electrode material layer having the average thickness of 18.8 µm. The porosity of the positive electrode material layer was 0.29.

Production Example 10 of Positive Electrode

Production of Positive Electrode J

Positive Electrode F as produced was compressed by means of a press (manufactured by Tester Sangyo Co., Ltd.) to thereby produce Positive Electrode J, which contained the positive electrode material layer having the average thickness of 17.6 µm. The porosity of the positive electrode material layer was 0.25.

Production Example 1 of Negative Electrode

Production of Negative Electrode A

As for a negative electrode active material, lithium titanate was used. The lithium titanate powder had a BET specific surface area of 7.0 $m^2/g$ as measured by nitrogen absorption, and had the average particle diameter (median diameter) of 6.5 µm, as measured by a laser diffraction particle size analyzer (SALD-2200, manufactured by Shimadzu Corporation).

Water was added to the lithium titanate and a conductive agent (acetylene black), and the resulting mixture was kneaded. Moreover, as a thickening agent, a 2% by mass carboxy methyl cellulose (CMC) aqueous solution was added to the kneaded product, and the resulting mixture was kneaded. To the resultant, a binder (styrene butadiene rubber SBR) was further added to thereby produce a negative electrode material layer composition (slurry). The solid content ratio of the negative electrode material layer was set as follows: lithium titanate/conductive agent/thickening agent/binder=93/5/1/1. The negative electrode material layer composition was applied onto an Al foil, followed by vacuum drying for 12 hours at 150° C., to thereby form a negative electrode material layer. A circle having a diameter of 16 mm was stamped out of the positive electrode material layer, to thereby produce Negative Electrode A.

The mass per unit area of the lithium titanate powder in the negative electrode material layer coated on the Al foil having a diameter of 16 mm was 10 $mg/cm^2$, the average thickness of the negative electrode material layer was 76.9 µm, and the porosity of the positive electrode material layer was 0.63.

Production Example 2 of Negative Electrode

Production of Negative Electrode B

Negative Electrode A as produced was compressed by means of a press (manufactured by Tester Sangyo Co., Ltd.) to thereby produce Negative electrode B, which contained the negative electrode material layer having the average thickness of 62.5 µm. The porosity of the negative electrode material layer was 0.54.

Production Example 3 of Negative Electrode

Production of Negative Electrode C

Negative Electrode A as produced was compressed by means of a press (manufactured by Tester Sangyo Co., Ltd.) to thereby produce Negative electrode C, which contained the negative electrode material layer having the average thickness of 55.6 µm. The porosity of the negative electrode material layer was 0.48.

Production Example 4 of Negative Electrode

Production of Negative Electrode D

Negative Electrode A as produced was compressed by means of a press (manufactured by Tester Sangyo Co., Ltd.) to thereby produce Negative electrode D, which contained the negative electrode material layer having the average thickness of 50.0 µm. The porosity of the negative electrode material layer was 0.43.

Production Example 5 of Negative Electrode

Production of Negative Electrode E

Negative Electrode A as produced was compressed by means of a press (manufactured by Tester Sangyo Co., Ltd.) to thereby produce Negative electrode E, which contained the negative electrode material layer having the average thickness of 45.5 µm. The porosity of the negative electrode material layer was 0.37.

Production Example 6 of Negative Electrode

Production of Negative Electrode F

As for a negative electrode active material, lithium titanate was used. The lithium titanate powder had a BET specific surface area of 7.0 $m^2/g$ as measured by nitrogen absorption, and had the average particle diameter (median diameter) of 6.5 µm, as measured by a laser diffraction particle size analyzer (SALD-2200, manufactured by Shimadzu Corporation).

Water was added to the lithium titanate and a conductive agent (acetylene black), and the resulting mixture was kneaded. Moreover, as a thickening agent, a 2% by mass carboxy methyl cellulose (CMC) aqueous solution was added to the kneaded product, and the resulting mixture was kneaded. To the resultant, a binder (styrene butadiene rubber SBR) was further added to thereby produce a negative electrode material layer composition (slurry). The solid content ratio of the negative electrode material layer was set as follows: lithium titanate/conductive agent/thickening agent/binder=93/5/1/1. The negative electrode material layer composition was applied onto an Al foil, followed by vacuum drying for 12 hours at 150° C., to thereby form a negative electrode material layer. A circle having a diameter of 16 mm was stamped out of the positive electrode material layer, to thereby produce Negative Electrode F.

The mass per unit area of the lithium titanate powder in the negative electrode material layer coated on the Al foil having a diameter of 16 mm was 3 $mg/cm^2$, the average thickness of the negative electrode material layer was 23.1 µm, and the porosity of the positive electrode material layer was 0.63.

Production Example 7 of Negative Electrode

Production of Negative Electrode G

Negative Electrode F as produced was compressed by means of a press (manufactured by Tester Sangyo Co., Ltd.) to thereby produce Negative electrode G, which contained the negative electrode material layer having the average thickness of 18.8 µm. The porosity of the negative electrode material layer was 0.54.

Production Example 8 of Negative Electrode

Production of Negative Electrode H

Negative Electrode F as produced was compressed by means of a press (manufactured by Tester Sangyo Co., Ltd.) to thereby produce Negative electrode H, which contained the negative electrode material layer having the average thickness of 16.7 µm. The porosity of the negative electrode material layer was 0.48.

Production Example 9 of Negative Electrode

Production of Negative Electrode I

Negative Electrode F as produced was compressed by means of a press (manufactured by Tester Sangyo Co., Ltd.) to thereby produce Negative electrode I, which contained the negative electrode material layer having the average thickness of 15.0 µm. The porosity of the negative electrode material layer was 0.43.

Production Example 10 of Negative Electrode

Production of Negative Electrode J

Negative Electrode F as produced was compressed by means of a press (manufactured by Tester Sangyo Co., Ltd.) to thereby produce Negative electrode J, which contained the negative electrode material layer having the average thickness of 13.6 µm. The porosity of the negative electrode material layer was 0.37.

<Production of Non-Aqueous Electrolyte Storage Element>

The positive electrode, the separator, the negative electrode, and the non-aqueous electrolyte was placed in a tin for producing a coin storage element (2032-Type, manufactured by Hohsen Corp.), and the tin was crimped with a crimping device (manufactured by Hohsen Corp.), to thereby produce a non-aqueous electrolyte storage element.

<Volume of Non-Aqueous Electrolyte Storage Element>

The volume of the non-aqueous electrolyte storage element was calculated by multiplying the area of the bottom surface with the thickness, where the surface surrounded by the peripheries of the positive electrode, the negative electrode, and the separator was determined as the bottom surface.

Example 1

The non-aqueous electrolyte storage element of Example 1 was assembled by placing Positive Electrode B, and Negative Electrode B in the coin tin, adding the non-aqueous electrolyte, in which 2 mol/L of $LiPF_6$ was dissolved (PC/DMC=1/1 (volume ratio)), and inserting, as a separator, cellulose having the average thickness of 140 µm and the porosity of 0.67 between the positive electrode and the negative electrode.

The ratio represented by [(V1+V2+V3)/V4] was 0.60, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.60, where P1 was the porosity of the positive electrode material layer, and P2 was the porosity of the separator.

<Evaluation Method 1: Capacity Maintaining Rate after 50 Cycles>

The obtained non-aqueous electrolyte storage element was charged up to the charge termination voltage of 3.5 V with constant electric current of 0.2 $mA/cm^2$ at room temperature (25° C.). After the first charging, the non-aqueous electrolyte storage element was discharged to 1.7 V with constant electric current of 0.2 $mA/cm^2$, to thereby perform initial charging and discharging. The storage element after the initial charging and discharging was charged to 3.5 V with constant electric current of 0.2 $mA/cm^2$, followed by discharging to 1.7 V with constant electric current of 0.2 $mA/cm^2$. The aforementioned charging and discharging process was determined as 1 cycle of charging and discharging. The charging-discharging cycle was performed up to 50 cycles. The aforementioned evaluation method was determined as Evaluation Method 1. Note that, the measurement was performed by means of a charge/discharge measurement device (TOSCAT3001, manufactured by TOYO SYSTEM CO., LTD.).

The capacity maintaining rate after 50 cycles was calculated using the discharge capacity at the 2nd cycle as a standard (100%), and was evaluated based on the following criteria.

[Evaluation Criteria]

A: The capacity maintaining rate after 50 cycles was 70% or higher.

B: The capacity maintaining rate after 50 cycles was lower than 70%.

<Evaluation Method 2: Capacity Maintaining Rate after 50 Cycles>

The non-aqueous electrolyte storage element of Example 1 was used. The storage element after the initial charging and discharging was charged to 3.5 V with constant electric current of 5.0 $mA/cm^2$, followed by discharging to 1.7 V with constant electric current of 5.0 $mA/cm^2$. The aforementioned charging and discharging process was determined as 1 cycle of charging and discharging. The charging-discharging cycle was performed up to 50 cycles. The aforementioned evaluation method was determined as Evaluation Method 2. Note that, the measurement was performed by means of a charge/discharge measurement device (TOSCAT3001, manufactured by TOYO SYSTEM CO., LTD.).

The capacity maintaining rate after 50 cycles was calculated using the discharge capacity at the 2nd cycle as a standard (100%), and was evaluated based on the following criteria.

[Evaluation Criteria]

A: The capacity maintaining rate after 50 cycles was 70% or higher.

B: The capacity maintaining rate after 50 cycles was lower than 70%.

As for the results, the capacity maintaining rate after 50 cycles determined by Evaluation Method 1 was 93.0%, and the capacity maintaining rate after 50 cycles determined by Evaluation Method 2 was 72.1%. The results are presented in Table 2.

Example 2

The non-aqueous electrolyte storage element of Example 2 was assembled by placing Positive Electrode C, and Negative Electrode B in the coin tin, adding the non-aqueous electrolyte, in which 2 mol/L of $LiPF_6$ was dissolved (PC/DMC=1/1 (volume ratio)), and inserting, as a separator, cellulose having the average thickness of 170 μm and the porosity of 0.67 between the positive electrode and the negative electrode.

The ratio represented by [(V1+V2+V3)/V4] was 0.58, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.29, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 91.4%, and 78.2%, respectively. The results are presented in Table 2.

Example 3

The non-aqueous electrolyte storage element of Example 3 was assembled by placing Positive Electrode D, and Negative Electrode B in the coin tin, adding the non-aqueous electrolyte, in which 2 mol/L of $LiPF_6$ was dissolved (PC/DMC=1/1 (volume ratio)), and inserting, as a separator, cellulose having the average thickness of 180 μm and the porosity of 0.67 between the positive electrode and the negative electrode.

The ratio represented by [(V1+V2+V3)/V4] was 0.56, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.15, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 90.8%, and 82.2%, respectively. The results are presented in Table 2.

Example 4

The non-aqueous electrolyte storage element of Example 4 was assembled by placing Positive Electrode B, and Negative Electrode C in the coin tin, adding the non-aqueous electrolyte, in which 2 mol/L of $LiPF_6$ was dissolved (PC/DMC=1/1 (volume ratio)), and inserting, as a separator, cellulose having the average thickness of 150 μm and the porosity of 0.67 between the positive electrode and the negative electrode.

The ratio represented by [(V1+V2+V3)/V4] was 0.60, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.56, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 89.8%, and 75.3%, respectively. The results are presented in Table 2.

Example 5

The non-aqueous electrolyte storage element of Example 5 was assembled by placing Positive Electrode C, and Negative Electrode C in the coin tin, adding the non-aqueous electrolyte, in which 2 mol/L of $LiPF_6$ was dissolved (PC/DMC=1/1 (volume ratio)), and inserting, as a separator, cellulose having the average thickness of 170 μm and the porosity of 0.67 between the positive electrode and the negative electrode.

The ratio represented by [(V1+V2+V3)/V4] was 0.57, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.29, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 91.7%, and 80.1%, respectively. The results are presented in Table 2.

Example 6

The non-aqueous electrolyte storage element of Example 6 was assembled by placing Positive Electrode D, and Negative Electrode C in the coin tin, adding the non-aqueous electrolyte, in which 2 mol/L of $LiPF_6$ was dissolved (PC/DMC=1/1 (volume ratio)), and inserting, as a separator, cellulose having the average thickness of 190 μm and the porosity of 0.67 between the positive electrode and the negative electrode.

The ratio represented by [(V1+V2+V3)/V4] was 0.56, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.14, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 93.3%, and 84.6%, respectively. The results are presented in Table 2.

Example 7

The non-aqueous electrolyte storage element of Example 7 was assembled by placing Positive Electrode B, and Negative Electrode D in the coin tin, adding the non-aqueous electrolyte, in which 2 mol/L of $LiPF_6$ was dissolved (PC/DMC=1/1 (volume ratio)), and inserting, as a separator, cellulose having the average thickness of 160 μm and the porosity of 0.67 between the positive electrode and the negative electrode.

The ratio represented by [(V1+V2+V3)/V4] was 0.59, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.52, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 91.5%, and 78.4%, respectively. The results are presented in Table 2.

Example 8

The non-aqueous electrolyte storage element of Example 8 was assembled by placing Positive Electrode C, and Negative Electrode D in the coin tin, adding the non-aqueous electrolyte, in which 2 mol/L of $LiPF_6$ was dissolved (PC/DMC=1/1 (volume ratio)), and inserting, as a separator, cellulose having the average thickness of 180 μm and the porosity of 0.67 between the positive electrode and the negative electrode.

The ratio represented by [(V1+V2+V3)/V4] was 0.57, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.27, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 92.2%, and 83.1%, respectively. The results are presented in Table 2.

Example 9

The non-aqueous electrolyte storage element of Example 9 was assembled by placing Positive Electrode D, and Negative Electrode D in the coin tin, adding the non-aqueous electrolyte, in which 2 mol/L of $LiPF_6$ was dissolved (PC/DMC=1/1 (volume ratio)), and inserting, as a separator, cellulose having the average thickness of 200 μm and the porosity of 0.67 between the positive electrode and the negative electrode.

The ratio represented by [(V1+V2+V3)/V4] was 0.55, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.14, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 90.1%, and 83.8%, respectively. The results are presented in Table 2.

Comparative Example 1

The non-aqueous electrolyte storage element of Comparative Example 1 was assembled by placing Positive Electrode A, and Negative Electrode B in the coin tin, adding the non-aqueous electrolyte, in which 2 mol/L of $LiPF_6$ was dissolved (PC/DMC=1/1 (volume ratio)), and inserting, as a separator, cellulose having the average thickness of 140 μm and the porosity of 0.67 between the positive electrode and the negative electrode.

The ratio represented by [(V1+V2+V3)/V4] was 0.63, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.87, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 90.6%, and 67.1%, respectively. The results are presented in Table 2.

Comparative Example 2

The non-aqueous electrolyte storage element of Comparative Example 2 was assembled by placing Positive Electrode B, and Negative Electrode A in the coin tin, adding the non-aqueous electrolyte, in which 2 mol/L of $LiPF_6$ was dissolved (PC/DMC=1/1 (volume ratio)), and inserting, as a separator, cellulose having the average thickness of 140 μm and the porosity of 0.67 between the positive electrode and the negative electrode.

The ratio represented by [(V1+V2+V3)/V4] was 0.62, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.60, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 74.3%, and 68.3%, respectively. The results are presented in Table 2.

Comparative Example 3

The non-aqueous electrolyte storage element of Comparative Example 3 was assembled by placing Positive Electrode E, and Negative Electrode D in the coin tin, adding the non-aqueous electrolyte, in which 2 mol/L of $LiPF_6$ was dissolved (PC/DMC=1/1 (volume ratio)), and inserting, as a separator, cellulose having the average thickness of 200 μm and the porosity of 0.67 between the positive electrode and the negative electrode.

The ratio represented by [(V1+V2+V3)/V4] was 0.55, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.11, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 74.3%, and 68.3%, respectively. The results are presented in Table 2.

Comparative Example 4

The non-aqueous electrolyte storage element of Comparative Example 4 was assembled by placing Positive Electrode E, and Negative Electrode E in the coin tin, adding the non-aqueous electrolyte, in which 2 mol/L of $LiPF_6$ was dissolved (PC/DMC=1/1 (volume ratio)), and inserting, as a separator, cellulose having the average thickness of 200 μm and the porosity of 0.67 between the positive electrode and the negative electrode.

The ratio represented by [(V1+V2+V3)/V4] was 0.54, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.11, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 65.1%, and 55.2%, respectively. The results are presented in Table 2.

Comparative Example 5

The non-aqueous electrolyte storage element of Comparative Example 5 was assembled by placing Positive Electrode D, and Negative Electrode D in the coin tin, adding the non-aqueous electrolyte, in which 2 mol/L of $LiPF_6$ was dissolved (PC/DMC=1/1 (volume ratio)), and inserting, as a separator, cellulose having the average thickness of 700 μm and the porosity of 0.67 between the positive electrode and the negative electrode.

The ratio represented by [(V1+V2+V3)/V4] was 0.62, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.04, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 89.2%, and 69.1%, respectively. The results are presented in Table 2.

Example 10

The non-aqueous electrolyte storage element of Example 10 was assembled by placing Positive Electrode G, and Negative Electrode G in the coin tin, adding the non-aqueous electrolyte, in which 2 mol/L of $LiPF_6$ was dissolved (PC/DMC=1/1 (volume ratio)), and inserting, as a separator, cellulose having the average thickness of 50 μm and the porosity of 0.67 between the positive electrode and the negative electrode.

The ratio represented by [(V1+V2+V3)/V4] was 0.61, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.50, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 90.2%, and 74.1%, respectively. The results are presented in Table 2.

Example 11

The non-aqueous electrolyte storage element of Example 11 was assembled by placing Positive Electrode H, and Negative Electrode G in the coin tin, adding the non-aqueous electrolyte, in which 2 mol/L of $LiPF_6$ was dissolved (PC/DMC=1/1 (volume ratio)), and inserting, as a separator, cellulose having the average thickness of 50 μm and the porosity of 0.67 between the positive electrode and the negative electrode.

The ratio represented by [(V1+V2+V3)/V4] was 0.58, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.29, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 93.3%, and 79.2%, respectively. The results are presented in Table 2.

Example 12

The non-aqueous electrolyte storage element of Example 12 was assembled by placing Positive Electrode I, and Negative Electrode G in the coin tin, adding the non-aqueous electrolyte, in which 2 mol/L of $LiPF_6$ was dissolved (PC/DMC=1/1 (volume ratio)), and inserting, as a separator, cellulose having the average thickness of 60 μm and the porosity of 0.67 between the positive electrode and the negative electrode.

The ratio represented by [(V1+V2+V3)/V4] was 0.57, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.14, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 93.1%, and 84.8%, respectively. The results are presented in Table 2.

Example 13

The non-aqueous electrolyte storage element of Example 13 was assembled by placing Positive Electrode G, and Negative Electrode H in the coin tin, adding the non-aqueous electrolyte, in which 2 mol/L of $LiPF_6$ was dissolved (PC/DMC=1/1 (volume ratio)), and inserting, as a separator, cellulose having the average thickness of 50 μm and the porosity of 0.67 between the positive electrode and the negative electrode.

The ratio represented by [(V1+V2+V3)/V4] was 0.60, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.50, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 90.1%, and 76.1%, respectively. The results are presented in Table 2.

Example 14

The non-aqueous electrolyte storage element of Example 14 was assembled by placing Positive Electrode H, and Negative Electrode H in the coin tin, adding the non-aqueous electrolyte, in which 2 mol/L of $LiPF_6$ was dissolved (PC/DMC=1/1 (volume ratio)), and inserting, as a separator, cellulose having the average thickness of 60 μm and the porosity of 0.67 between the positive electrode and the negative electrode.

The ratio represented by [(V1+V2+V3)/V4] was 0.58, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.25, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 91.5%, and 81.4%, respectively. The results are presented in Table 2.

Example 15

The non-aqueous electrolyte storage element of Example 15 was assembled by placing Positive Electrode I, and Negative Electrode H in the coin tin, adding the non-aqueous electrolyte, in which 2 mol/L of $LiPF_6$ was dissolved (PC/DMC=1/1 (volume ratio)), and inserting, as a separator, cellulose having the average thickness of 60 μm and the porosity of 0.67 between the positive electrode and the negative electrode.

The ratio represented by [(V1+V2+V3)/V4] was 0.56, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.14, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 90.7%, and 86.6%, respectively. The results are presented in Table 2.

Example 16

The non-aqueous electrolyte storage element of Example 16 was assembled by placing Positive Electrode G, and Negative Electrode I in the coin tin, adding the non-aqueous electrolyte, in which 2 mol/L of $LiPF_6$ was dissolved (PC/DMC=1/1 (volume ratio)), and inserting, as a separator, cellulose having the average thickness of 50 μm and the porosity of 0.67 between the positive electrode and the negative electrode.

The ratio represented by [(V1+V2+V3)/V4] was 0.59, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.50, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 92.2%, and 79.3%, respectively. The results are presented in Table 2.

Example 17

The non-aqueous electrolyte storage element of Example 17 was assembled by placing Positive Electrode H, and Negative Electrode I in the coin tin, adding the non-aqueous electrolyte, in which 2 mol/L of $LiPF_6$ was dissolved (PC/DMC=1/1 (volume ratio)), and inserting, as a separator, cellulose having the average thickness of 60 μm and the porosity of 0.67 between the positive electrode and the negative electrode.

The ratio represented by [(V1+V2+V3)/V4] was 0.57, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.25, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 91.6%, and 84.4%, respectively. The results are presented in Table 2.

Example 18

The non-aqueous electrolyte storage element of Example 18 was assembled by placing Positive Electrode I, and Negative Electrode I in the coin tin, adding the non-aqueous electrolyte, in which 2 mol/L of $LiPF_6$ was dissolved (PC/DMC=1/1 (volume ratio)), and inserting, as a separator, cellulose having the average thickness of 60 μm and the porosity of 0.67 between the positive electrode and the negative electrode.

The ratio represented by [(V1+V2+V3)/V4] was 0.55, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.14, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 90.8%, and 85.3%, respectively. The results are presented in Table 2.

Comparative Example 6

The non-aqueous electrolyte storage element of Comparative Example 6 was assembled by placing Positive Electrode F, and Negative Electrode G in the coin tin, adding the non-aqueous electrolyte, in which 2 mol/L of $LiPF_6$ was dissolved (PC/DMC=1/1 (volume ratio)), and inserting, as a separator, cellulose having the average thickness of 100 μm and the porosity of 0.67 between the positive electrode and the negative electrode.

The ratio represented by [(V1+V2+V3)/V4] was 0.65, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.36, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 89.3%, and 68.9%, respectively. The results are presented in Table 2.

Comparative Example 7

The non-aqueous electrolyte storage element of Comparative Example 7 was assembled by placing Positive Electrode G, and Negative Electrode F in the coin tin, adding the non-aqueous electrolyte, in which 2 mol/L of $LiPF_6$ was dissolved (PC/DMC=1/1 (volume ratio)), and inserting, as a separator, cellulose having the average thickness of 100 μm and the porosity of 0.67 between the positive electrode and the negative electrode.

The ratio represented by [(V1+V2+V3)/V4] was 0.64, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.25, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 91.4%, and 69.2%, respectively. The results are presented in Table 2.

Comparative Example 8

The non-aqueous electrolyte storage element of Comparative Example 8 was assembled by placing Positive Electrode J, and Negative Electrode I in the coin tin, adding the non-aqueous electrolyte, in which 2 mol/L of $LiPF_6$ was dissolved (PC/DMC=1/1 (volume ratio)), and inserting, as a separator, cellulose having the average thickness of 60 μm and the porosity of 0.67 between the positive electrode and the negative electrode.

The ratio represented by [(V1+V2+V3)/V4] was 0.55, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.11, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 79.4%, and 68.7%, respectively. The results are presented in Table 2.

Comparative Example 9

The non-aqueous electrolyte storage element of Comparative Example 9 was assembled by placing Positive Electrode J, and Negative Electrode J in the coin tin, adding the non-aqueous electrolyte, in which 2 mol/L of $LiPF_6$ was dissolved (PC/DMC=1/1 (volume ratio)), and inserting, as a separator, cellulose having the average thickness of 60 μm and the porosity of 0.67 between the positive electrode and the negative electrode.

The ratio represented by [(V1+V2+V3)/V4] was 0.54, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.11, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 68.7%, and 58.3%, respectively. The results are presented in Table 2.

Example 19

The non-aqueous electrolyte storage element of Example 19 was assembled by placing Positive Electrode G, and Negative Electrode B in the coin tin, adding the non-aqueous electrolyte, in which 2 mol/L of $LiPF_6$ was dissolved (PC/DMC=1/1 (volume ratio)), and inserting, as a separator, cellulose having the average thickness of 30 μm and the porosity of 0.67 between the positive electrode and the negative electrode.

The ratio represented by [(V1+V2+V3)/V4] was 0.58, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.84, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 93.4%, and 73.3%, respectively. The results are presented in Table 2.

Example 20

The non-aqueous electrolyte storage element of Example 20 was assembled by placing Positive Electrode H, and Negative Electrode B in the coin tin, adding the non-aqueous electrolyte, in which 2 mol/L of $LiPF_6$ was dissolved (PC/DMC=1/1 (volume ratio)), and inserting, as a separator, cellulose having the average thickness of 30 μm and the porosity of 0.67 between the positive electrode and the negative electrode.

The ratio represented by [(V1+V2+V3)/V4] was 0.55, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.49, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 92.6%, and 78.7%, respectively. The results are presented in Table 2.

Example 21

The non-aqueous electrolyte storage element of Example 21 was assembled by placing Positive Electrode I, and Negative Electrode B in the coin tin, adding the non-aqueous electrolyte, in which 2 mol/L of $LiPF_6$ was dissolved (PC/DMC=1/1 (volume ratio)), and inserting, as a separator, cellulose having the average thickness of 30 μm and the porosity of 0.67 between the positive electrode and the negative electrode.

The ratio represented by [(V1+V2+V3)/V4] was 0.53, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.27, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 91.4%, and 83.7%, respectively. The results are presented in Table 2.

Example 22

The non-aqueous electrolyte storage element of Example 22 was assembled by placing Positive Electrode G, and Negative Electrode C in the coin tin, adding the non-aqueous electrolyte, in which 2 mol/L of $LiPF_6$ was dissolved (PC/DMC=1/1 (volume ratio)), and inserting, as a separator, cellulose having the average thickness of 30 μm and the porosity of 0.67 between the positive electrode and the negative electrode.

The ratio represented by [(V1+V2+V3)/V4] was 0.55, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.84, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 92.7%, and 75.8%, respectively. The results are presented in Table 2.

Example 23

The non-aqueous electrolyte storage element of Example 23 was assembled by placing Positive Electrode H, and Negative Electrode C in the coin tin, adding the non-aqueous electrolyte, in which 2 mol/L of $LiPF_6$ was dissolved (PC/DMC=1/1 (volume ratio)), and inserting, as a separator, cellulose having the average thickness of 40 μm and the porosity of 0.67 between the positive electrode and the negative electrode.

The ratio represented by [(V1+V2+V3)/V4] was 0.53, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.37, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 91.3%, and 81.2%, respectively. The results are presented in Table 2.

Example 24

The non-aqueous electrolyte storage element of Example 24 was assembled by placing Positive Electrode I, and Negative Electrode C in the coin tin, adding the non-aqueous electrolyte, in which 2 mol/L of $LiPF_6$ was dissolved (PC/DMC=1/1 (volume ratio)), and inserting, as a separator, cellulose having the average thickness of 40 μm and the porosity of 0.67 between the positive electrode and the negative electrode.

The ratio represented by [(V1+V2+V3)/V4] was 0.52, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.21, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 91.7%, and 86.0%, respectively. The results are presented in Table 2.

Example 25

The non-aqueous electrolyte storage element of Example 25 was assembled by placing Positive Electrode G, and Negative Electrode D in the coin tin, adding the non-aqueous electrolyte, in which 2 mol/L of $LiPF_6$ was dissolved (PC/DMC=1/1 (volume ratio)), and inserting, as a separator, cellulose having the average thickness of 30 μm and the porosity of 0.67 between the positive electrode and the negative electrode.

The ratio represented by [(V1+V2+V3)/V4] was 0.53, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.84, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 90.3%, and 78.3%, respectively. The results are presented in Table 2.

Example 26

The non-aqueous electrolyte storage element of Example 26 was assembled by placing Positive Electrode H, and Negative Electrode D in the coin tin, adding the non-aqueous electrolyte, in which 2 mol/L of $LiPF_6$ was dissolved (PC/DMC=1/1 (volume ratio)), and inserting, as a separator, cellulose having the average thickness of 40 μm and the porosity of 0.67 between the positive electrode and the negative electrode.

The ratio represented by [(V1+V2+V3)/V4] was 0.51, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.37, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 91.1%, and 84.1%, respectively. The results are presented in Table 2.

Example 27

The non-aqueous electrolyte storage element of Example 27 was assembled by placing Positive Electrode I, and Negative Electrode D in the coin tin, adding the non-aqueous electrolyte, in which 2 mol/L of $LiPF_6$ was dissolved (PC/DMC=1/1 (volume ratio)), and inserting, as a separator, cellulose having the average thickness of 50 μm and the porosity of 0.67 between the positive electrode and the negative electrode.

The ratio represented by [(V1+V2+V3)/V4] was 0.51, where V1 was the volume of pores of the positive electrode material layer per unit area of the positive electrode, V2 was the volume of pores of the negative electrode material layer per unit area of the negative electrode, V3 was the volume of pores per unit area of the separator, and V4 was the total volume of the non-aqueous electrolyte storage element.

The ratio represented by P1/P2 was 0.16, where P1 was the porosity of the positive electrode material layer, and P2 was the porosity of the separator.

Charging-discharging cycles were performed on the obtained non-aqueous electrolyte storage element in the same manner as in Example 1. As for the results, the capacity maintaining rate after 50 cycles as determined by Evaluation Method 1, and the capacity maintaining rate after 50 cycles as determined by Evaluation Method 2 as in the same manner as in Example 1 were 90.8%, and 86.1%, respectively. The results are presented in Table 2.

The conditions of the non-aqueous electrolyte storage elements of Examples 1 to 17, and Comparative Examples 1 to 9 are summarized in the following Tables 1-1 to 1-3.

TABLE 1-1

| | Positive Electrode | | | | | |
|---|---|---|---|---|---|---|
| | Material | Type | Area density (mg/cm$^2$) | Volume density (g/cm$^3$) | Pore volume (mm$^3$/cm$^2$) | Porosity of positive electrode material layer |
| Ex. 1 | Graphite | B | 10 | 1.0 | 5.6 | 0.56 |
| Ex. 2 | Graphite | C | 10 | 1.3 | 3.2 | 0.42 |
| Ex. 3 | Graphite | D | 10 | 1.6 | 1.8 | 0.29 |
| Ex. 4 | Graphite | B | 10 | 1.0 | 5.6 | 0.56 |
| Ex. 5 | Graphite | C | 10 | 1.3 | 3.2 | 0.42 |
| Ex. 6 | Graphite | D | 10 | 1.6 | 1.8 | 0.29 |
| Ex. 7 | Graphite | B | 10 | 1.0 | 5.6 | 0.56 |
| Ex. 8 | Graphite | C | 10 | 1.3 | 3.2 | 0.42 |
| Ex. 9 | Graphite | D | 10 | 1.6 | 1.8 | 0.29 |
| Comp. Ex. 1 | Graphite | A | 10 | 0.8 | 8.1 | 0.65 |
| Comp. Ex. 2 | Graphite | B | 10 | 1.0 | 5.6 | 0.56 |
| Comp. Ex. 3 | Graphite | E | 10 | 1.7 | 1.5 | 0.25 |
| Comp. Ex. 4 | Graphite | E | 10 | 1.7 | 1.5 | 0.25 |
| Comp. Ex. 5 | Graphite | D | 10 | 1.6 | 1.8 | 0.29 |
| Ex. 10 | Graphite | G | 3 | 1.0 | 1.7 | 0.56 |
| Ex. 11 | Graphite | H | 3 | 1.3 | 1.0 | 0.42 |
| Ex. 12 | Graphite | I | 3 | 1.6 | 0.5 | 0.29 |
| Ex. 13 | Graphite | G | 3 | 1.0 | 1.7 | 0.56 |
| Ex. 14 | Graphite | H | 3 | 1.3 | 1.0 | 0.42 |
| Ex. 15 | Graphite | I | 3 | 1.6 | 0.5 | 0.29 |
| Ex. 16 | Graphite | G | 3 | 1.0 | 1.7 | 0.56 |
| Ex. 17 | Graphite | H | 3 | 1.3 | 1.0 | 0.42 |
| Ex. 18 | Graphite | I | 3 | 1.6 | 0.5 | 0.29 |
| Comp. Ex. 6 | Graphite | F | 3 | 0.8 | 2.4 | 0.65 |
| Comp. Ex. 7 | Graphite | G | 3 | 1.0 | 1.7 | 0.56 |
| Comp. Ex. 8 | Graphite | J | 3 | 1.7 | 0.4 | 0.25 |
| Comp. Ex. 9 | Graphite | J | 3 | 1.7 | 0.4 | 0.25 |
| Ex. 19 | Graphite | G | 3 | 1.0 | 1.7 | 0.56 |
| Ex. 20 | Graphite | H | 3 | 1.3 | 1.0 | 0.42 |
| Ex. 21 | Graphite | I | 3 | 1.6 | 0.5 | 0.29 |
| Ex. 22 | Graphite | G | 3 | 1.0 | 1.7 | 0.56 |
| Ex. 23 | Graphite | H | 3 | 1.3 | 1.0 | 0.42 |
| Ex. 24 | Graphite | I | 3 | 1.6 | 0.5 | 0.29 |
| Ex. 25 | Graphite | G | 3 | 1.0 | 1.7 | 0.56 |
| Ex. 26 | Graphite | H | 3 | 1.3 | 1.0 | 0.42 |
| Ex. 27 | Graphite | I | 3 | 1.6 | 0.5 | 0.29 |

In Examples 1 to 27, the capacity of the positive electrode was 0.05 mAh/cm$^2$ to 0.06 mAh/cm$^2$, per 1 mg/cm$^2$. Since the area density of the positive electrode was 3 mg/cm$^2$ to 10 mg/cm$^2$, the anion storage and desorption amount per unit area of the positive electrode was 0.15 mAh/cm$^2$ to 0.60 mAh/cm$^2$.

TABLE 1-2

| | | | Negative Electrode | | | |
|---|---|---|---|---|---|---|
| | Material | Type | Area density (mg/cm$^2$) | Volume density (g/cm$^3$) | Pore volume (mm$^3$/cm$^2$) | Porosity of negative electrode material layer |
| Ex. 1 | Lithium titanate | B | 10 | 1.6 | 3.4 | 0.54 |
| Ex. 2 | Lithium titanate | B | 10 | 1.6 | 3.4 | 0.54 |
| Ex. 3 | Lithium titanate | B | 10 | 1.6 | 3.4 | 0.54 |
| Ex. 4 | Lithium titanate | C | 10 | 1.8 | 2.7 | 0.48 |
| Ex. 5 | Lithium titanate | C | 10 | 1.8 | 2.7 | 0.48 |
| Ex. 6 | Lithium titanate | C | 10 | 1.8 | 2.7 | 0.48 |
| Ex. 7 | Lithium titanate | D | 10 | 2.0 | 2.2 | 0.43 |
| Ex. 8 | Lithium titanate | D | 10 | 2.0 | 2.2 | 0.43 |
| Ex. 9 | Lithium titanate | D | 10 | 2.0 | 2.2 | 0.43 |
| Comp. Ex. 1 | Lithium titanate | B | 10 | 1.6 | 3.4 | 0.54 |
| Comp. Ex. 2 | Lithium titanate | A | 10 | 1.3 | 4.8 | 0.63 |
| Comp. Ex. 3 | Lithium titanate | D | 10 | 2.0 | 2.2 | 0.43 |
| Comp. Ex. 4 | Lithium titanate | E | 10 | 2.2 | 1.7 | 0.37 |
| Comp. Ex. 5 | Lithium titanate | D | 10 | 2.0 | 2.2 | 0.43 |
| Ex. 10 | Lithium titanate | G | 3 | 1.6 | 1.0 | 0.54 |
| Ex. 11 | Lithium titanate | G | 3 | 1.6 | 1.0 | 0.54 |
| Ex. 12 | Lithium titanate | G | 3 | 1.6 | 1.0 | 0.54 |
| Ex. 13 | Lithium titanate | H | 3 | 1.8 | 0.8 | 0.48 |
| Ex. 14 | Lithium titanate | H | 3 | 1.8 | 0.8 | 0.48 |
| Ex. 15 | Lithium titanate | H | 3 | 1.8 | 0.8 | 0.48 |
| Ex. 16 | Lithium titanate | I | 3 | 2.0 | 0.6 | 0.43 |
| Ex. 17 | Lithium titanate | I | 3 | 2.0 | 0.6 | 0.43 |
| Ex. 18 | Lithium titanate | I | 3 | 2.0 | 0.6 | 0.43 |
| Comp. Ex. 6 | Lithium titanate | G | 3 | 1.6 | 1.0 | 0.54 |
| Comp. Ex. 7 | Lithium titanate | F | 3 | 1.3 | 1.5 | 0.63 |
| Comp. Ex. 8 | Lithium titanate | I | 3 | 2.0 | 0.6 | 0.43 |
| Comp. Ex. 9 | Lithium titanate | J | 3 | 2.2 | 0.5 | 0.37 |
| Ex. 19 | Lithium titanate | B | 10 | 1.6 | 3.4 | 0.54 |
| Ex. 20 | Lithium titanate | B | 10 | 1.6 | 3.4 | 0.54 |
| Ex. 21 | Lithium titanate | B | 10 | 1.6 | 3.4 | 0.54 |
| Ex. 22 | Lithium titanate | C | 10 | 1.8 | 2.7 | 0.48 |
| Ex. 23 | Lithium titanate | C | 10 | 1.8 | 2.7 | 0.48 |
| Ex. 24 | Lithium titanate | C | 10 | 1.8 | 2.7 | 0.48 |
| Ex. 25 | Lithium titanate | D | 10 | 2.0 | 2.2 | 0.43 |
| Ex. 26 | Lithium titanate | D | 10 | 2.0 | 2.2 | 0.43 |
| Ex. 27 | Lithium titanate | D | 10 | 2.0 | 2.2 | 0.43 |

In Examples 1 to 27, the capacity of the negative electrode was 0.170 mAh/cm$^2$ per 1 mg/cm$^2$. As mentioned above, the capacity of the positive electrode was 0.05 mAh/cm$^2$ to 0.06 mAh/cm$^2$ per 1 mg/cm$^2$. Therefore, the capacity of the negative electrode per unit area was larger than the capacity of the positive electrode per unit area.

The capacity ratio C1/C2 of the capacity C1 of the negative electrode per unit area to the capacity C2 of the positive electrode per unit area was 0.170 mAh/cm$^2$/0.05 mAh/cm$^2$ to 0.170 mAh/cm$^2$/0.06 mAh/cm$^2$=3.4 to 2.8.

TABLE 1-3

| | Separator | | | |
|---|---|---|---|---|
| | Type | Average thickness (μm) | Pore volume (mm$^3$/cm$^2$) | Porosity |
| Ex. 1 | Cellulose | 140 | 9.4 | 0.67 |
| Ex. 2 | Cellulose | 170 | 9.4 | 0.67 |
| Ex. 3 | Cellulose | 180 | 9.4 | 0.67 |
| Ex. 4 | Cellulose | 150 | 9.4 | 0.67 |
| Ex. 5 | Cellulose | 170 | 9.4 | 0.67 |
| Ex. 6 | Cellulose | 190 | 9.4 | 0.67 |
| Ex. 7 | Cellulose | 160 | 9.4 | 0.67 |
| Ex. 8 | Cellulose | 180 | 9.4 | 0.67 |
| Ex. 9 | Cellulose | 200 | 9.4 | 0.67 |
| Comp. Ex. 1 | Cellulose | 140 | 9.4 | 0.67 |
| Comp. Ex. 2 | Cellulose | 140 | 9.4 | 0.67 |
| Comp. Ex. 3 | Cellulose | 200 | 9.4 | 0.67 |
| Comp. Ex. 4 | Cellulose | 200 | 9.4 | 0.67 |
| Comp. Ex. 5 | Cellulose | 700 | 9.4 | 0.67 |

TABLE 1-3-continued

| | | Separator | | |
|---|---|---|---|---|
| | Type | Average thickness (μm) | Pore volume (mm³/cm²) | Porosity |
| Ex. 10 | Cellulose | 50 | 9.4 | 0.67 |
| Ex. 11 | Cellulose | 50 | 9.4 | 0.67 |
| Ex. 12 | Cellulose | 60 | 9.4 | 0.67 |
| Ex. 13 | Cellulose | 50 | 9.4 | 0.67 |
| Ex. 14 | Cellulose | 60 | 9.4 | 0.67 |
| Ex. 15 | Cellulose | 60 | 9.4 | 0.67 |
| Ex. 16 | Cellulose | 50 | 9.4 | 0.67 |
| Ex. 17 | Cellulose | 60 | 9.4 | 0.67 |
| Ex. 18 | Cellulose | 60 | 9.4 | 0.67 |
| Comp. Ex. 6 | Cellulose | 100 | 9.4 | 0.67 |
| Comp. Ex. 7 | Cellulose | 100 | 9.4 | 0.67 |
| Comp. Ex. 8 | Cellulose | 60 | 9.4 | 0.67 |
| Comp. Ex. 9 | Cellulose | 60 | 9.4 | 0.67 |
| Ex. 19 | Cellulose | 30 | 9.4 | 0.67 |
| Ex. 20 | Cellulose | 30 | 9.4 | 0.67 |
| Ex. 21 | Cellulose | 30 | 9.4 | 0.67 |
| Ex. 22 | Cellulose | 30 | 9.4 | 0.67 |
| Ex. 23 | Cellulose | 40 | 9.4 | 0.67 |
| Ex. 24 | Cellulose | 40 | 9.4 | 0.67 |
| Ex. 25 | Cellulose | 30 | 9.4 | 0.67 |
| Ex. 26 | Cellulose | 40 | 9.4 | 0.67 |
| Ex. 27 | Cellulose | 50 | 9.4 | 0.67 |

TABLE 2

| | Porosity of positive material layer/porosity of separator | Total of pore volumes of members/total volume of element | Evaluation Method 1 | | Evaluation Method 2 | |
|---|---|---|---|---|---|---|
| | | | Capacity maintaining rate (%) | Judgement | Capacity maintaining rate (%) | Judgement |
| Ex. 1 | 0.60 | 0.60 | 93.0 | A | 72.1 | A |
| Ex. 2 | 0.29 | 0.58 | 91.4 | A | 78.2 | A |
| Ex. 3 | 0.15 | 0.56 | 90.8 | A | 82.2 | A |
| Ex. 4 | 0.56 | 0.60 | 89.8 | A | 75.3 | A |
| Ex. 5 | 0.29 | 0.57 | 91.7 | A | 80.1 | A |
| Ex. 6 | 0.14 | 0.56 | 93.3 | A | 84.6 | A |
| Ex. 7 | 0.52 | 0.59 | 91.5 | A | 78.4 | A |
| Ex. 8 | 0.27 | 0.57 | 92.2 | A | 83.1 | A |
| Ex. 9 | 0.14 | 0.55 | 90.1 | A | 83.8 | A |
| Comp. Ex. 1 | 0.87 | 0.63 | 90.6 | A | 67.1 | B |
| Comp. Ex. 2 | 0.60 | 0.62 | 91.1 | A | 68.4 | B |
| Comp. Ex. 3 | 0.11 | 0.55 | 74.3 | A | 68.3 | B |
| Comp. Ex. 4 | 0.11 | 0.54 | 65.1 | B | 55.2 | B |
| Comp. Ex. 5 | 0.04 | 0.62 | 89.2 | A | 69.1 | B |
| Ex. 10 | 0.50 | 0.61 | 90.2 | A | 74.1 | A |
| Ex. 11 | 0.29 | 0.58 | 93.3 | A | 79.2 | A |
| Ex. 12 | 0.14 | 0.57 | 93.1 | A | 84.8 | A |
| Ex. 13 | 0.50 | 0.60 | 90.1 | A | 76.1 | A |
| Ex. 14 | 0.25 | 0.58 | 91.5 | A | 81.4 | A |
| Ex. 15 | 0.14 | 0.56 | 90.7 | A | 86.6 | A |
| Ex. 16 | 0.50 | 0.59 | 92.2 | A | 79.3 | A |
| Ex. 17 | 0.25 | 0.57 | 91.6 | A | 84.4 | A |
| Ex. 18 | 0.14 | 0.55 | 90.8 | A | 85.3 | A |
| Comp. Ex. 6 | 0.36 | 0.65 | 89.3 | A | 68.9 | B |
| Comp. Ex. 7 | 0.25 | 0.64 | 91.4 | A | 69.2 | B |
| Comp. Ex. 8 | 0.11 | 0.55 | 79.4 | B | 68.7 | B |
| Comp. Ex. 9 | 0.11 | 0.54 | 68.7 | A | 58.3 | B |
| Ex. 19 | 0.84 | 0.58 | 93.4 | A | 73.3 | A |
| Ex. 20 | 0.49 | 0.55 | 92.6 | A | 78.7 | A |
| Ex. 21 | 0.27 | 0.53 | 91.4 | A | 83.7 | A |
| Ex. 22 | 0.84 | 0.55 | 92.7 | A | 75.8 | A |
| Ex. 23 | 0.37 | 0.53 | 91.3 | A | 81.2 | A |
| Ex. 24 | 0.21 | 0.52 | 91.7 | A | 86.0 | A |
| Ex. 25 | 0.84 | 0.53 | 90.3 | A | 78.3 | A |
| Ex. 26 | 0.37 | 0.51 | 91.1 | A | 84.1 | A |
| Ex. 27 | 0.16 | 0.51 | 90.8 | A | 85.1 | A |

For example, the embodiments of the present invention are as follows:

<1> A non-aqueous electrolyte storage element including:
a positive electrode including a positive electrode material layer, where the positive electrode material layer includes a positive electrode active material capable of reversibly accumulating and releasing anions;
a negative electrode including a negative electrode material layer, where the negative electrode material layer includes a negative electrode active material capable of reversibly accumulating and releasing cations;
a separator disposed between the positive electrode and the negative electrode; and
a non-aqueous electrolyte comprising an electrolyte salt, wherein the non-aqueous electrolyte storage element satisfies the following formulae:

$$0.5 \leq [(V1+V2+V3)/V4] \leq 0.61; \text{ and}$$

$$0.14 \leq P1/P2 \leq 0.84,$$

where V1 is a volume of pores of the positive electrode material layer per unit area of the positive electrode, V2 is a volume of pores of the negative electrode material layer per unit area of the negative electrode, V3 is a volume of pores per unit area of the separator, and V4 is a total volume of the non-aqueous electrolyte storage element, and
where P1 is a porosity of the positive electrode material layer, and P2 is a porosity of the separator.

<2> The non-aqueous electrolyte storage element according to <1>, wherein both the porosity P1 of the positive electrode material layer, and a porosity of the negative electrode material layer are 0.25 to 0.65.

<3> The non-aqueous electrolyte storage element according to <1> or <2>, wherein an anion storage and desorption amount per unit area of the positive electrode is 0.15 mAh/cm² to 0.60 mAh/cm².

<4> The non-aqueous electrolyte storage element according to any one of <1> to <3>, wherein a capacity of the negative electrode per unit area is larger than a capacity of the positive electrode per unit area.

<5> The non-aqueous electrolyte storage element according to <4>, wherein a capacity ratio represented by C1/C2 is 1.05 to 6, where C1 is the capacity of the negative electrode per unit area, and C2 is the capacity of the positive electrode per unit area.

<6> The non-aqueous electrolyte storage element according to any one of <1> to <5>, wherein the electrolyte salt is a lithium salt.

<7> The non-aqueous electrolyte storage element according to any one of <1> to <6>, wherein an amount of the electrolyte salt in the non-aqueous electrolyte is 1.5 mol/L to 3.0 mol/L.

<8> The non-aqueous electrolyte storage element according to any one of <1> to <7>, wherein the positive electrode active material is a carbonaceous material.

<9> The non-aqueous electrolyte storage element according to any one of <1> to <8>, wherein the negative electrode active material is a carbonaceous material, or lithium titanate.

<10> The non-aqueous electrolyte storage element according to any one of <1> to <9>, wherein an average thickness of the separator is 20 μm to 200 μm.

This application claims priority to Japanese application No. 2014-255826, filed on Dec. 18, 2014 and incorporated herein by reference; and Japanese application No. 2015-184079, filed on Sep. 17, 2015 and incorporated herein by reference.

What is claimed is:
1. A non-aqueous electrolyte storage element comprising:
a positive electrode comprising a positive electrode material layer, where the positive electrode material layer comprises a positive electrode active material capable of reversibly accumulating and releasing anions;
a negative electrode comprising a negative electrode material layer, where the negative electrode material layer comprises a negative electrode active material capable of reversibly accumulating and releasing cations;
a separator disposed between the positive electrode and the negative electrode; and
a non-aqueous electrolyte comprising an electrolyte salt, wherein the non-aqueous electrolyte storage element satisfies the following formulae:

$$0.5 \leq [(V1+V2+V3)/V4] \leq 0.61; \text{ and}$$

$$0.14 \leq P1/P2 \leq 0.84,$$

where V1 is a volume of pores of the positive electrode material layer per unit area of the positive electrode, V2 is a volume of pores of the negative electrode material layer per unit area of the negative electrode, V3 is a volume of pores per unit area of the separator, and V4 is a total volume of the non-aqueous electrolyte storage element, and
where P1 is a porosity of the positive electrode material layer, and P2 is a porosity of the separator.

2. The non-aqueous electrolyte storage element according to claim 1, wherein both the porosity P1 of the positive electrode material layer, and a porosity of the negative electrode material layer are 0.25 to 0.65.

3. The non-aqueous electrolyte storage element according to claim 1, wherein an anion storage and desorption amount per unit area of the positive electrode is 0.15 mAh/cm² to 0.60 mAh/cm².

4. The non-aqueous electrolyte storage element according to claim 1, wherein a capacity of the negative electrode per unit area is larger than a capacity of the positive electrode per unit area.

5. The non-aqueous electrolyte storage element according to claim 4, wherein a capacity ratio represented by C1/C2 is 1.05 to 6, where C1 is the capacity of the negative electrode per unit area, and C2 is the capacity of the positive electrode per unit area.

6. The non-aqueous electrolyte storage element according to claim 1, wherein the electrolyte salt is a lithium salt.

7. The non-aqueous electrolyte storage element according to claim 1, wherein an amount of the electrolyte salt in the non-aqueous electrolyte is 1.5 mol/L to 3.0 mol/L.

8. The non-aqueous electrolyte storage element according to claim 1, wherein the positive electrode active material is a carbonaceous material.

9. The non-aqueous electrolyte storage element according to claim 1, wherein the negative electrode active material is a carbonaceous material, or lithium titanate.

10. The non-aqueous electrolyte storage element according to claim 1, wherein an average thickness of the separator is 20 μm to 200 μm.

* * * * *